United States Patent
Eggers et al.

(10) Patent No.: US 12,024,037 B2
(45) Date of Patent: Jul. 2, 2024

(54) CHARGING SYSTEM, VEHICLE INCLUDING A CHARGING SYSTEM, AND CHARGING METHOD

(71) Applicant: Zero Motorcycles, Inc., Scotts Valley, CA (US)

(72) Inventors: Eland Eggers, Santa Cruz, CA (US); Akshay Agrawal, San Jose, CA (US); Abe Askenazi, Scotts Valley, CA (US); Robert Hazbun, Scotts Valley, CA (US); Will M. Brunner, Scotts Valley, CA (US)

(73) Assignee: ZERO MOTORCYCLES, INC., Scotts Valley, CA (US)

( * ) Notice: Subject to any disclaimer, the term of this patent is extended or adjusted under 35 U.S.C. 154(b) by 64 days.

(21) Appl. No.: 17/518,210

(22) Filed: Nov. 3, 2021

(65) Prior Publication Data
US 2023/0135028 A1    May 4, 2023

(51) Int. Cl.
*B60L 53/22* (2019.01)
*B60L 53/14* (2019.01)
(Continued)

(52) U.S. Cl.
CPC ............... *B60L 53/22* (2019.02); *B60L 53/53* (2019.02); *B60L 53/66* (2019.02); *B60L 53/68* (2019.02);
(Continued)

(58) Field of Classification Search
CPC .......... B60L 53/22; B60L 53/53; B60L 53/66; B60L 53/68; B60L 53/00; B60L 53/14;
(Continued)

(56) References Cited

U.S. PATENT DOCUMENTS

| | | | |
|---|---|---|---|
| 8,198,859 B2 * | 6/2012 | Tyler | B60L 53/34 320/140 |
| 8,384,359 B2 | 2/2013 | Narel et al. | |

(Continued)

FOREIGN PATENT DOCUMENTS

| | | | | |
|---|---|---|---|---|
| CN | 109643871 A | * | 4/2019 | ............. B60L 53/12 |
| CN | 111313518 A | * | 6/2020 | ............. B60L 53/11 |

(Continued)

OTHER PUBLICATIONS

International Search Report and Written Opinion issued in corresponding International Application No. PCT/UE22/48793, dated Feb. 8, 2023, pp. 1-15.

(Continued)

*Primary Examiner* — Phallaka Kik
(74) *Attorney, Agent, or Firm* — Carter, DeLuca & Farrell LLP

(57) ABSTRACT

A charging system for an electric vehicle includes: a rechargeable energy storage device adapted to store electrical energy and to supply the stored electrical energy to at least one electric motor of the vehicle to propel the vehicle; a charger adapted to supply electrical energy to the energy storage device according to a selectable power rating of at least two power ratings to charge and/or recharge the energy storage device based on a selected one of power ratings; and a controller adapted to select one of the power ratings of the charger to set the charger to charge and/or recharge the energy storage device based on the selected one of the power ratings.

17 Claims, 4 Drawing Sheets

(51) Int. Cl.
*B60L 53/53* (2019.01)
*B60L 53/65* (2019.01)
*B60L 53/66* (2019.01)
*B60L 53/68* (2019.01)
*H02J 7/00* (2006.01)

(52) U.S. Cl.
CPC .......... *H02J 7/00043* (2020.01); *B60L 53/14* (2019.02); *B60L 53/65* (2019.02); *B60L 53/665* (2019.02); *H02J 2310/48* (2020.01); *Y02T 10/70* (2013.01); *Y02T 10/72* (2013.01); *Y02T 90/12* (2013.01); *Y02T 90/14* (2013.01)

(58) Field of Classification Search
CPC ........ B60L 53/65; B60L 53/665; B60L 58/12; H02J 7/00043; H02J 2310/48; Y02T 10/70; Y02T 10/072; Y02T 90/12; Y02T 90/14
USPC .......................... 320/109, 125, 108, 113, 115
See application file for complete search history.

(56) References Cited

U.S. PATENT DOCUMENTS

| | | | |
|---|---|---|---|
| 8,860,362 | B2 | 10/2014 | Kamen et al. |
| 8,912,753 | B2 | 12/2014 | Pudar et al. |
| 9,056,553 | B2* | 6/2015 | Cun ........................ B60L 3/04 |
| 9,296,309 | B2* | 3/2016 | Gibeau ................. B60K 37/02 |
| 9,796,286 | B2 | 10/2017 | Atluri et al. |
| 10,355,611 | B2* | 7/2019 | Nagashima ............ B60L 55/00 |
| 10,541,543 | B2 | 1/2020 | Eaves |
| 10,549,644 | B2* | 2/2020 | Kojima ................. B60L 53/305 |
| 10,611,247 | B1* | 4/2020 | Breen ................... H02J 7/1423 |
| 10,926,657 | B2 | 2/2021 | Schlaudraff |
| 10,933,763 | B2* | 3/2021 | Hall ........................ B60L 53/62 |
| 10,949,843 | B2* | 3/2021 | Mouftah ............... H04L 9/3234 |
| 11,270,243 | B1* | 3/2022 | Roy ........................ B60L 53/67 |
| 11,520,881 | B2* | 12/2022 | Wang ..................... G06F 21/64 |
| 11,554,685 | B2* | 1/2023 | Dunjic .................. H04L 9/0825 |
| 2010/0141204 | A1* | 6/2010 | Tyler ...................... B60L 55/00 320/109 |
| 2010/0141205 | A1* | 6/2010 | Tyler ...................... B60L 53/65 320/109 |
| 2010/0145535 | A1* | 6/2010 | Tyler ...................... G06Q 50/40 700/295 |
| 2010/0179893 | A1 | 7/2010 | Burke et al. |
| 2011/0046831 | A1 | 2/2011 | Ananthakrishna |
| 2012/0119569 | A1* | 5/2012 | Karalis ................. B60L 53/302 307/9.1 |
| 2012/0126743 | A1* | 5/2012 | Rivers, Jr. ................. H02J 3/14 320/137 |
| 2014/0207498 | A1* | 7/2014 | Cho ................... G06Q 30/0645 705/5 |
| 2015/0137755 | A1* | 5/2015 | Sadano ................... B60L 53/16 320/109 |
| 2015/0165917 | A1 | 6/2015 | Robers |
| 2016/0152153 | A1 | 6/2016 | Yang |
| 2018/0272881 | A1* | 9/2018 | Kojima ................... B60L 53/31 |
| 2018/0336551 | A1* | 11/2018 | Mouftah ............... H04L 9/3213 |
| 2018/0354382 | A1* | 12/2018 | Schlaudraff ............ B60L 53/12 |
| 2019/0383637 | A1* | 12/2019 | Teske ................. G01C 21/3682 |
| 2020/0091753 | A1* | 3/2020 | Maruyama ............ H02M 7/217 |
| 2020/0156494 | A1* | 5/2020 | Niikawa ................. B60L 50/60 |
| 2021/0080282 | A1* | 3/2021 | Goei ....................... B60L 53/66 |
| 2022/0024334 | A1* | 1/2022 | Marczi ................... H02J 7/0013 |
| 2022/0185148 | A1* | 6/2022 | Kim ........................ B60L 53/14 |

FOREIGN PATENT DOCUMENTS

| | | | | |
|---|---|---|---|---|
| CN | 112277671 | A | * 1/2021 | ............. B60L 53/00 |
| DE | 102014103039 | A1 | * 9/2014 | ............. B60L 11/14 |
| DE | 102020107365 | A1 | * 9/2021 | ............. B60L 53/30 |
| DE | 102021104552 | A1 | * 8/2022 | |
| EP | 2875984 | A2 | * 5/2015 | ............ B60L 15/007 |
| EP | 3379689 | A1 | * 9/2018 | .......... B60L 11/1825 |
| KR | 102191926 | B1 | * 12/2020 | |
| KR | 20210083837 | A | * 7/2021 | |
| WO | WO-2012070432 | A1 | * 5/2012 | ............ B60L 11/185 |
| WO | 2013/044357 | A1 | 4/2013 | |
| WO | 2018/098400 | A1 | 5/2018 | |

OTHER PUBLICATIONS

International Report on Patentability issued in corresponding International Application No. PCT/US2022/048793, dated May 2, 20214, pp. 1-12.

* cited by examiner

CHARGING SYSTEM, VEHICLE INCLUDING A CHARGING SYSTEM, AND CHARGING METHOD

FIELD OF THE INVENTION

The present invention relates to a charging system, to a vehicle including a charging system, and to a charging method.

BACKGROUND INFORMATION

Plug-in electric vehicles typically include an on-board charging system that regulates the process of charging the vehicle's battery or batteries from electric energy obtained via the electric power grid. The vehicle may be charged by connecting a charging cable between a power outlet, e.g., in a residential setting at the home of the owner or operator, in a commercial setting at a recharging station, etc., and the vehicle. For a so-called Level 1 charger, typically used in a residential setting, a charging cable connects between the vehicle's charging system and a standard 120 or 240 VAC, 15 or 20 amp grounded outlet and delivers, for example, 1.4 kW to the vehicle; for a so-called Level 2 charger, a charging cable connects between the vehicle's charging system and a 208 to 240 VAC, 40 amp circuit and delivers, for example, 6.2 to 7.6 kW to the vehicle; so-called Level 3 chargers, also referred to as Direct Current Fast Chargers (DCFCs), can deliver, for example, 50 to over 200 kW to the vehicle but typically require 480 VAC electrical service. The greater power output of Level 2 chargers results in faster charging than Level 1 chargers, and the greater power output of Level 3 chargers results in faster charging than Level 2, and also Level 1, chargers. The charger may have a power rating, e.g., representing the maximum power that a charger can apply to charge the battery.

Typically included in the sale, or lease, of an electric vehicle is a Level 1 charging cable that allows the owner or operator of the vehicle to plug the vehicle into a power outlet located, for example, at their residence or any location where a standard 120 VAC outlet is available. To take advantage of Level 2 or 3 charging, the owner or operator of the vehicle may be required to purchase additional equipment, including charging cables, a Level 2 or 3 charger, greater capacity batteries, etc.

SUMMARY

A charging system for an electric vehicle includes: a rechargeable energy storage device adapted to store electrical energy and to supply the stored electrical energy to at least one electric motor of the vehicle to propel the vehicle; a charger adapted to supply electrical energy to the energy storage device according to a selectable power rating of at least two different power ratings to charge and/or recharge the energy storage device based on a selected one of power ratings; and a controller adapted to select one of the power ratings of the charger to set the charger to charge and/or recharge the energy storage device based on the selected one of the power ratings.

The energy storage device may include a rechargeable battery, e.g., a lithium-ion battery.

The charger may include an AC power inlet adapted to connect to an AC power source, and the charger may be adapted to supply electrical energy received via the AC power inlet to the energy storage device.

The power rating may represent a maximum power deliverable to the energy storage device by the charger.

The charger may be adapted to supply electrical energy to the energy storage device according to a first one of the power ratings until the controller selects a second one of the power ratings that is different than the first one of the power ratings, and the charger may be adapted to supply electrical energy to the energy storage device according to the second one of the power ratings after the controller selects the second one of the power ratings.

The first one of the power ratings may represent a lower power rating than the second one of the power ratings.

The charging system may include a communication device adapted to communicate with an external electronic device to receive an instruction from the external electronic device and adapted to communicate with the controller to cause the controller to select one of the power ratings.

The external electronic device may include a portable electronic device.

The external electronic device may include a non-portable electronic device.

The external electronic device may include a server, and the communication device may be adapted to communicate with the server via a wireless communication link.

The communication device may be adapted to communicate with the portable electronic device via a wireless communication link.

The controller may include a memory device adapted to store data that represents the selected one of the power ratings, and the charger may be adapted to supply electrical energy to the energy storage device according to the selected one of the power ratings based on the data stored in the memory device of the controller.

The charger may include a memory device adapted to store data that represents the selected one of the power ratings, and the charger may be adapted to supply electrical energy to the energy storage device according to the selected one of the power ratings based on the data stored in the memory device of the charger.

The controller may be adapted to store the data that represents the selected one of the power ratings in the memory device of the charger.

The server may be adapted to communicate with a second electronic device and to receive an instruction from the second electronic device to communicate to the communication device of the vehicle an instruction to select one of the power ratings.

The charger may be permanently adapted to supply electrical energy to the energy storage device according to the second one of the power ratings after the controller selects the second one of the power ratings.

The vehicle may be arranged as an electric motorcycle.

According to an example embodiment of the present invention, a charging system for an electric vehicle that includes a rechargeable energy storage device adapted to store electrical energy and to supply the stored electrical energy to at least one electric motor of the vehicle to propel the vehicle includes: a charger adapted to supply electrical energy to the energy storage device according to a selectable power rating of at least two power ratings to charge and/or recharge the energy storage device based on a selected one of power ratings; and a controller adapted to select one of the power ratings of the charger to set the charger to charge and/or recharge the energy storage device based on the selected one of the power ratings.

According to an example embodiment of the present invention, an electric vehicle includes: at least one electric motor adapted to propel the vehicle; a rechargeable energy storage device adapted to store electrical energy and to supply the stored electrical energy to at least one electric motor of the vehicle to propel the vehicle; a charger adapted to supply electrical energy to the energy storage device according to a selectable power rating of at least two power ratings to charge and/or recharge the energy storage device based on a selected one of power ratings; and a controller adapted to select one of the power ratings of the charger to set the charger to charge and/or recharge the energy storage device based on the selected one of the power ratings.

Further features and aspects of example embodiments of the present invention are described in more detail below with reference to the appended schematic Figures.

DETAILED DESCRIPTION

Figure 1:
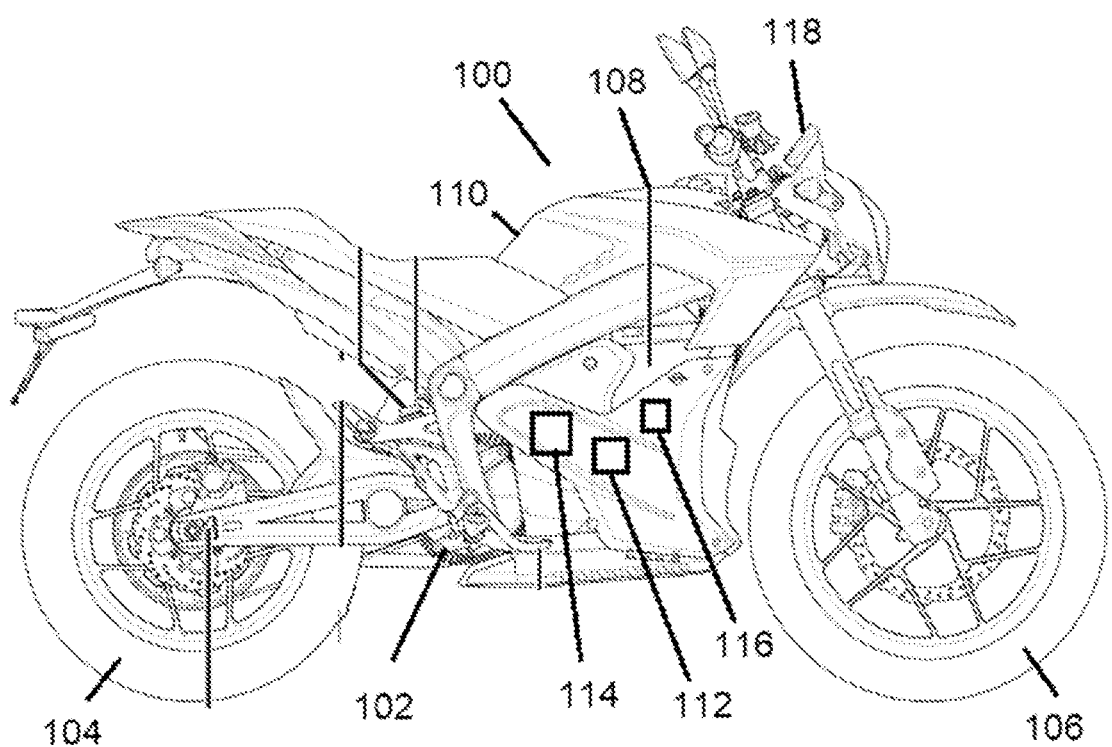
FIG. 1 is a schematic left side view of a vehicle according to an example embodiment of the present invention.

FIG. 1 is a schematic side view of a vehicle 100 according to an example embodiment of the present invention. The vehicle 100 may be arranged as an electric vehicle (EV), a plug-in hybrid electric vehicle (PHEV), etc. For example, the vehicle 100 is arranged as an electric motorcycle, which includes a motor 102, e.g., an air-cooled, brushless, permanent-magnet 3-phase AC motor, powered by an energy storage device 108, e.g., a battery, a lithium-ion battery, etc., to drive the rear wheel 104, and/or the front wheel 106, to thereby propel the vehicle 100 according to the driver's operation thereof. The vehicle 110 includes a charging port connectable to an AC power source to charge and/or recharge the battery 108 as described in more detail below.

The battery 108 may be charged and/or recharged via electrical energy delivered by the power grid. For example, the vehicle 100 may include an on-board charger 114 that includes, or is controlled by, a controller 112, which may also be on-board the vehicle 100. It should be understood that that the controller 112 and/or the charger 114 may be on-board the vehicle 100 or external to the vehicle 100 and may be integrated into a single unit or may be arranged as separate units.

Figure 2:
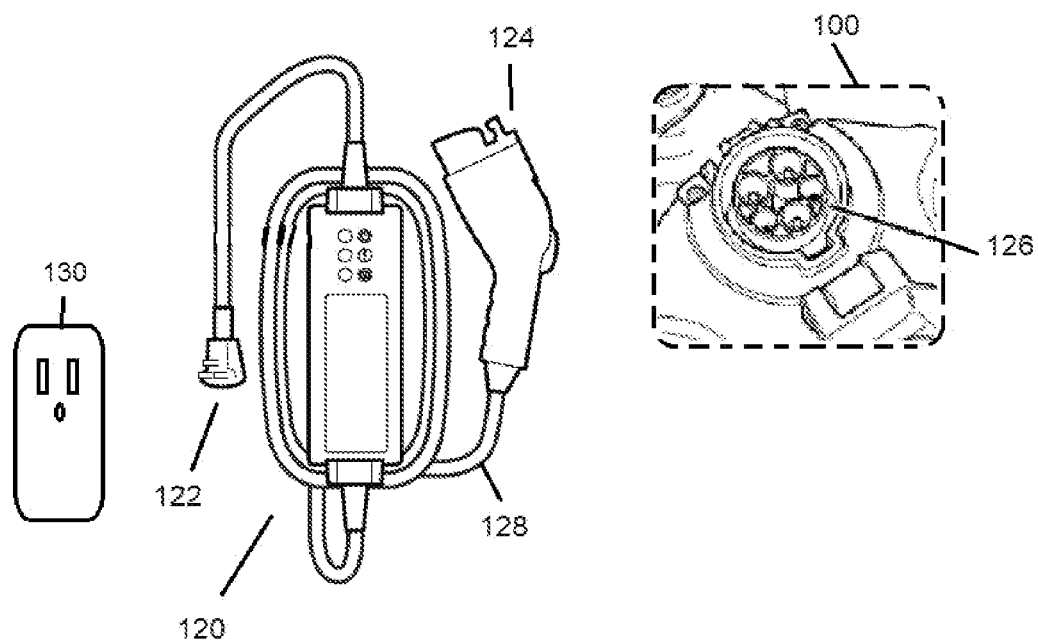
FIG. 2 schematically illustrates a charging cable for the vehicle.

Referring, for example, to FIG. 2, the vehicle 100 may include a socket 126 connected to charger 114 to deliver AC, e.g., 120 VAC, 240 VAC, etc., current thereto. The socket 126 is adapted to receive a complementary mating plug 124 of a charging cable, power cord, or power adapter, 120, which may be included with the sale of the vehicle 100. Another plug 122 is provided at the opposite end of the charging cable 120 as the plug 124, and the plugs 122, 124 are electrically connected to each other by wire 128, e.g., a three-conductor, grounded wire. The plug 122 is adapted to plug into a socket 130, e.g., a standard 120 VAC outlet. Thus, when the battery 108 is to be charged or recharged, plug 124 is plugged into socket 126 and plug 122 is plugged into socket 130, so that AC current is delivered to charger 114.

As noted above, socket 130 may be arranged as a standard 120 VAC outlet and may be arranged as, for example, a 15- or 20-amp circuit. Thus, the maximum power deliverable to charger 114 via socket 130 is 1,800 W (i.e., 1.8 kW), for a 120 VAC, 15-amp circuit, and 2,400 W (i.e., 2.4 kW), for a 120 VAC, 20-amp circuit, although the maximum power actually deliverable may be reduced, e.g., for safety reasons. Utilizing a 240 VAC, 20-amp socket, for example, the maximum power may be reduced to, for example, 16 amps, e.g., 3,840 W (i.e., 3.84 kW), e.g., for safety reasons. The charging cable 120 may therefore have a, e.g., minimum, rating of 1.8 kW to 2.4 kW. The charger 114 may therefore be arranged to charge or recharge battery 108 at Level 1 charging levels when utilizing charging cable 120. Exceeding the power rating of charging cable 120 may result in overheating of the charging cable 120, the charger 114, the controller 112, the socket(s) 126, 130, etc., and result in damage thereto. Moreover, exceeding the power rating of charging cable 120 may result in an electrical fire. Therefore, in order to reduce and/or eliminate the possibility of exceeding the power rating of charging cable 120, e.g., by connecting charging cable 120 to a higher voltage and/or higher amperage circuit in an effort to decrease the time to charge and/or recharge the battery 108, the charger 114 and/or controller 112 may limit the power delivered from socket 130 via charging cable 120 to a level within or below the rating of charging cable, e.g., to Level 1 charging levels. In other words, the charger 114 and/or controller 112 may be adapted to charge the battery 108 at a first power rating.

Figure 3:
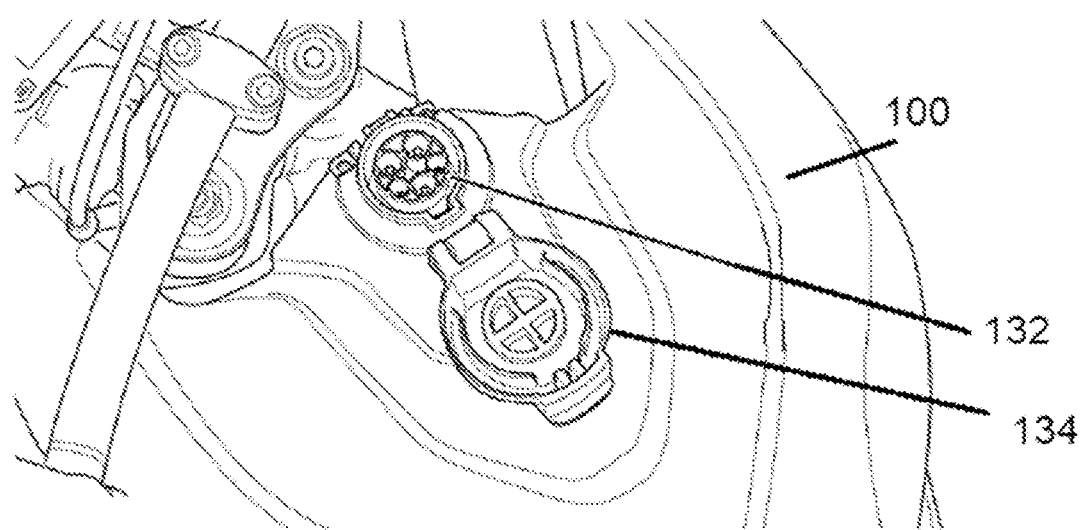
FIG. 3 schematically illustrates a charging port of the vehicle.

As illustrated in FIG. 3, the vehicle 100 may be equipped with an additional or alternative socket 132 that is connectable to a higher-rated circuit than socket 124. For example, socket 132 may be connectable to a Level 2 or Level 3 charger that can deliver power to the charger 114 and/or controller 112 at a higher level than charging cable 120. The socket 132 may, for example, be arranged as an SAE J1772, also referred to as a J plug, charging receptacle and may have a protective cover 134. Thus, the charger 114 and/or controller 112 may be adapted to charge the battery 108 at a second power rating, e.g., corresponding to Level 2 charging, and a third power rating, e.g., corresponding to Level 3 charging. It should be understood that the charger 114 and/or controller may be adapted to charge the battery 108 at additional or fewer power ratings. Moreover, it should be understood that the charger's power rating may, or may not, be directly related to levels of charging defined by industry standards, e.g., Level 1, Level 2, Level 3, etc., in accordance with the SAE J1772 standard. The socket 132 may be adapted to receive current at a variety of charging levels. For example, socket 132 may operate at Level 1, Level 2, and Level 3 charging levels, depending upon the charging equipment delivering current to the socket 132. Therefore, charger 114 and/or controller 112 may be subject to a variety of charging levels and charging paths, e.g., via socket 126 and/or socket 132.

To accommodate the variety of charging levels, and charging paths, the charger 114 may be able to alter its power rating. For example, the charger 114 may be configured at the time of its manufacture, at the time of installation on vehicle 100, and/or at the time of sale, for example, to charge the battery 108 at a Level 1 charging level. Thus, in this state, the maximum power that the charger 114 can apply to charge and/or recharge the battery 108 may be limited to that corresponding to Level 1 charging, regardless of whether the battery 108 is charged and/or recharged via socket 126 or socket 132 and regardless of the maximum power that the external charging equipment is capable of delivering to the charger 114. Therefore, for example, safety may be increased by maintaining the lowest charge level, even though the driver or operator of the vehicle 100 may connect the charger 114 to a Level 2 or Level 3 charger.

As described above, the vehicle 100 may include multiple sockets 126, 132 to charge and/or recharge the battery 108 via charger 114. However, it should be understood that vehicle 100 may include only a single socket 126 or 132 to charge and/or recharge the battery 108 via charger 114, and charger 114 may be adapted to accommodate any charge level, based on, for example, the charging equipment to which the vehicle 100 and charger 114 is connected and supplied with current to charge and/or recharge the battery 108.

After manufacture, installation on vehicle 100, and sale, for example, the charger 114 may be reconfigured to change, e.g., increase, its power rating. Thus, for example, the power rating of the charger 114 may be increased from that at the time of purchase of the vehicle 100, after the owner or operator of the vehicle 100 purchases and installs, for example, Level 2 charging equipment in their place of residence. Based on the foregoing, only after the vehicle 100 can be charged at the higher Level 2 charging level is the power rating of the charger 114 changed. The charger 114 may also be reconfigured to change, e.g., increase, its power rating after the owner or operator of the vehicle 100 has access to, for example, Level 3 charging equipment. Thus, the power rating of the charger 114 may be reconfigured to coincide with the charging equipment that is owned and/or accessible to the owner or operator of the vehicle 100.

The power rating of the charger 114 may be changed without changing the charger 114 itself. That is, the same charger 114 may be adapted to charge the battery 108 at different power ratings, such that the owner or operator of the vehicle 100 does not have to install a new or different charger 114 to obtain the different, e.g., higher, power rating. For example, it may be possible to set the power rating of the charger 114 by the owner or operator of the vehicle 100 via a menu system of an interface of the vehicle 100 displayed on a display screen 118 of the vehicle 100.

Figure 4:
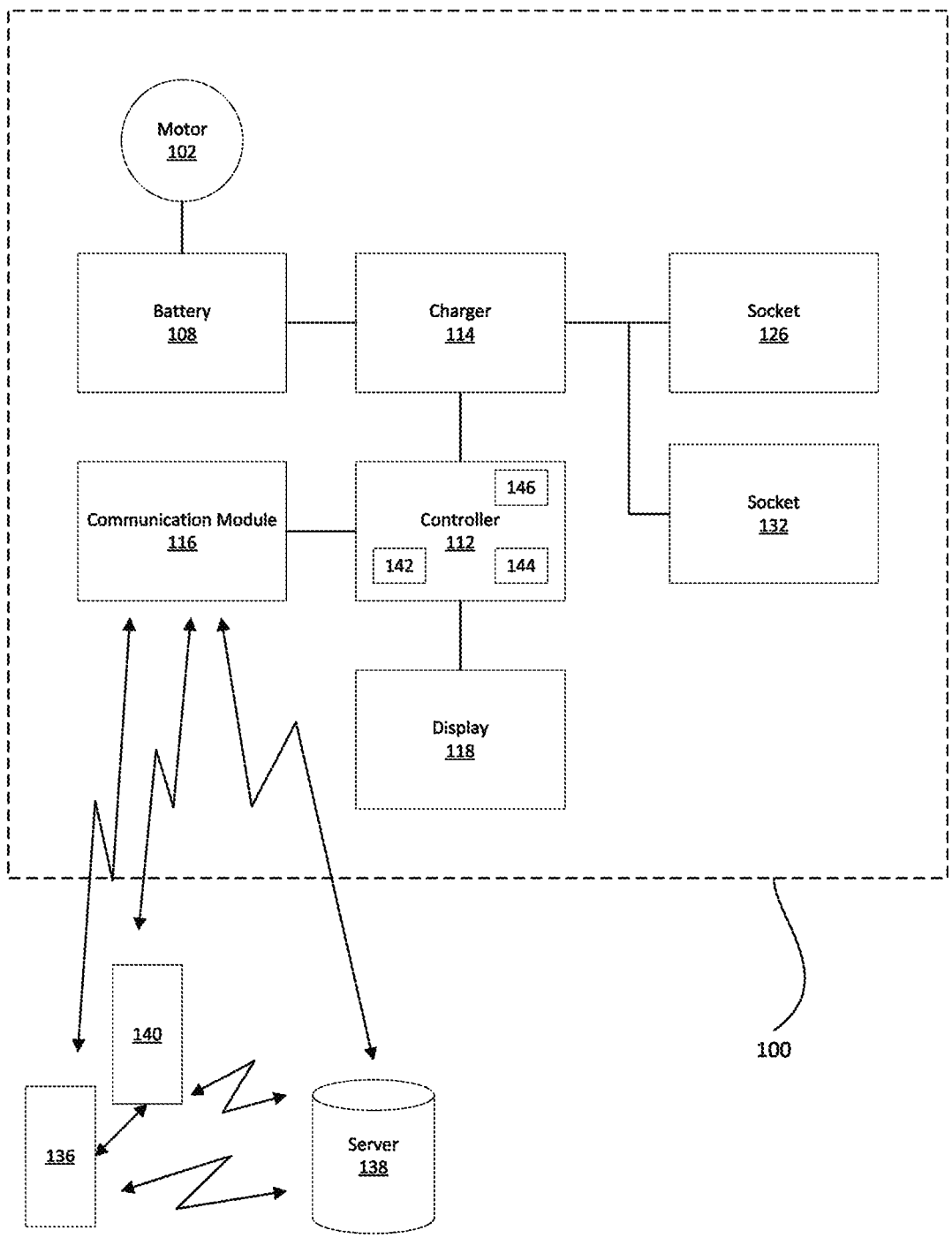
FIG. 4 schematically illustrates a charge controller of the vehicle.

It is also possible to change the power rating of the charger 114 via a remote system. For example, as illustrated in FIG. 4, the controller 112 of the vehicle 100 is connected to the charger 114 and the dash display 118, and the charger 114 is connected to socket 126, 132 to receive power therefrom and to battery 108 to charge and/or recharge the battery 108 by power received via socket 126, 132. The battery 108 is connected to motor 102 to provide power to the motor 102 to propel the vehicle. The vehicle 100 includes a communication module 116, which may be adapted to communicate with external devices via wired connection(s) to the external devices and/or wireless connection(s) to the external devices. For example, the communications module 116 may include WiFi, Bluetooth, cellular, etc., interface(s) to communicate with the external devices.

The controller 112 may include one or more electronic control units (ECUs), microprocessors, memory units (e.g., non-volatile memory units, volatile memory units, firmware, and/or non-transitory storage devices) adapted to store data and control instructions and/or software for operation of the vehicle 100, other hardware or logic circuitry, etc. The controller 112 may be arranged as a single, integrated unit, e.g., integrated with the dash display 118, or it may be arranged as a plurality of sub-units distributed throughout the vehicle 100. FIG. 4 schematically illustrates the controller 112 as including a processor, a microprocessor, other logic unit(s), circuitry, hardware, and/or firmware, collectively indicated by reference numeral 142, memory unit(s) 144, and software 146, e.g., stored in a non-transitory computer readable storage medium as a set of instructions that are executable by a processor. For example, the controller 112 may include microprocessor adapted to execute the set of instructions stored in the non-transitory computer readable storage medium to perform the processes described herein.

The external devices may include, for example, a portable electronic device 136, such as a smartphone, tablet, portable computer, laptop, notebook computer, etc., a remote server 138, a non-portable electronic device, such as a desktop computer, etc. The external devices may be owned and/or operated by the owner of the vehicle 100, the manufacture of the vehicle 100, a dealer of the manufacture of the vehicle 100, an authorized repair facility, a third-party reseller, an OEM supplier, an independent third party, etc. Thus, for example, the owner of the vehicle 100 may modify the power rating of their vehicle 100 utilizing an app or other function or system their smartphone 136 or personal computer 140 that is in communication, e.g., direct communication, with the controller 112 via the communication module 116, e.g., via Bluetooth, WiFi, etc., connectivity between the smartphone 136 and the communication module 116. Additionally or alternatively, the owner of the vehicle 100 may modify the power rating of their vehicle 100 utilizing their smartphone 136 or personal computer 140 that is in indirect communication with the controller 112, e.g., via server 138, which is in communication with the controller 112 via WiFi, cellular, etc., communication. Additionally or alternatively, the server 138 may be in communication with the controller 112 via WiFi, cellular, etc., communication so that the server 138 communicates with the controller 112 to change the power rating of the charger 114 without any involvement by the owner or operator of the vehicle 100. Thus, for example, the owner or operator of the vehicle 100 may initiate the change of the power rating of the charger 114 via their portable electronic device 136 and/or non-portable electronic device 138, either directly and/or via a server 138, and/or the change of the power rating of the charger 114 may be initiated, e.g., pushed, to the vehicle 100 via the server 138 without any involvement by the owner or operator of the vehicle 100.

As illustrated, for example, in FIG. 4, the portable electronic device 136, the server 138, and/or the non-portable electronic device 140 may communicate with the communication module 116, e.g., wired and/or wirelessly, and such communication may be bidirectional. As also illustrated, for example, in FIG. 4, the portable electronic device 136, the server 138, and/or the non-portable electronic device may communicate with each other, e.g., wired and/or wirelessly, and such communication may be bidirectional. In a wireless configuration, the modification of the power rating of the charger 114 may be arranged as an over-the-air (OTA) modification or upgrade.

As an example, the owner or operator of the vehicle 100 may acquire the vehicle 100 and its standard, e.g., Level 1, charging cable. Thus, as delivered from the dealer or factory, the charger 114 may be adapted to charge the battery 108 at a first power rating, e.g., a lowest power rating, given the limited or minimal current that may be deliverable via the basic charging cable 120 from wall outlet 130 to socket 126, as described in more detail above. The owner or operator of the vehicle 100 may subsequently acquire and/or install Level 2 charging equipment at their residence. To take advantage of the higher charging level, as compared to Level 1 charging, to reduce the time required to charge and/or recharge the battery 108, the power rating of the charger 114 may be changed to accept the greater power of the Level 2 charging equipment. For example, the owner or operator of the vehicle 100 may have installed an app or other program or functionality on their portable electronic device 136 and/or non-portable electronic device 140 to change the power rating of the charger 114, directly, e.g., via WiFi, Bluetooth, etc., communication, or indirectly, e.g., via server 138. Additionally or alternatively, the owner or operator of the vehicle 100 may acquire, for example, the Level 2 charging equipment from the manufacture of the vehicle 100, a dealer, third-party reseller, etc., which may, in turn, push the change of the power rating of the charger 114 to the vehicle 100 based on the acquisition of the charging equipment without any separate involvement by the owner or operator of the vehicle 100, e.g., via server 138 in communication with the communication module 116 over a WiFi, cellular, etc., communication link. The non-portable electronic device 140 may, for example, be arranged as a workshop or dealer computer or diagnostic system that may be connected via a wired connection to the communication module 116. Thus, the power rating of the charger 114 may be made at the time that the owner or operator of the vehicle 100 brings the vehicle 100 to a dealer or repair or service facility for service. While the change of the power rating of the charger 114 is described in relation to the change or acquisition of particular charging equipment, it should be understood that the power rating of the charger 114 may be changed independent of any change or acquisition of charging equipment. For example, the power rating of the charger 114 may be changed based on seasonal or time-based demands on the power grid, e.g., reduced during peak times and increased during off-peak times, reduced during a local heat wave and increased or restored after the heat wave passes, etc. Moreover, the power rating of the charger 114 may be changed as an upgrade, e.g., a purchased upgrade, from the manufacturer of the vehicle 100.

In certain implementations, for example, those employing the IEC-62196 standard, the charging equipment, also referred to as electric vehicle supply equipment (EVSE), may communicate or signal to the charger 114 of the vehicle 100 a maximum AC current, and the charger 114 may be required to not exceed that maximum AC current. The change of the power rating of the charger 114, as described herein, may increase the possible current that the charger 114 may consume while not exceeding the limits of the EVSE.

As illustrated in FIG. 4, for example, the controller 112 includes a memory 144, e.g., volatile memory, non-volatile memory device, firmware, etc., which may store data indicative of the power rating of the charger 114, at two or more power ratings. Thus, for example, the memory 144 may store first data indicative of a lowest power rating of the charger 114, and this first data may be stored in the memory 144 at the time of manufacture or delivery of the vehicle 100. The memory 144 may store second, third, etc., data indicative of a different, e.g., successively higher, power ratings of the charger 114. Thus, the controller 112 may control the charger 114 to charge and/or recharge the battery 108 at a particular level, rate, or peak power output, based on the data stored in the memory 144 that is indicative of the power rating. Accordingly, changing the power rating of the charger 114 entails storing corresponding data in the memory 144, e.g., based on communication between the communication module 116 and the portable electronic device 136, server 138, and/or non-portable electronic device.

The data stored in the memory 144 that indicates the power rating of the charger 114 may be changed to reflect an increase and/or decrease of the power rating of the charger 114. Thus, for example, as the owner or operator of the vehicle 100 changes charging equipment, e.g., by upgrading or downgrading, the power rating of the charger 114 may be changed based on the data stored in the memory. It is also possible that the data stored in the memory 144 may be changed only to increase, or upgrade, the power rating of the charger 114 and that any increase of the power rating of the charger 114 is permanent and also associated with the particular vehicle to which the upgrade was applied, e.g., associated with the VIN (Vehicle Identification Number) of the vehicle 100. Therefore, the upgrade of the power rating of the charger 114 may remain with the vehicle 100 throughout the lifetime of the vehicle 100, regardless of ownership or transfer of ownership of the vehicle 100.

The change, e.g., upgrade, of the power rating of the charger 114 may be performed in the following manner. The portable electronic device 136 and/or non-portable electronic device 140 may include an app or other dedicated software stored and executable thereby and/or may access a website, e.g., a website of the manufacture of the vehicle 100. The ability to change, e.g., upgrade, the power rating of the charger 114 may be presented to the user via the app, other software, or website, and the user may select that change, e.g., upgrade, to be applied to their vehicle 100. For example, the user may be required to log into the app, other software, or website, e.g., via log in credentials, such as a username and password or other authentication mechanism. The particular vehicle 100 may be associated with the user, e.g., the owner, lessee, operator, etc., of the vehicle 100. For example, the VIN of the vehicle 100 may be registered or associated with the log-in of the user, owner, or operator of the vehicle 100. In certain implementations, the user, owner, or operator of the vehicle 100 may be required to register and create an account, profile, log-in, etc., and to associate their vehicle 100 with their account, profile, log-in, etc., based on, for example, the VIN of the vehicle 100.

Owners that own or operate multiple vehicles 100, e.g., a fleet of vehicles 100, may select particular ones of the vehicles 100 that will have the power rating of their chargers 114 changed and/or may have the power rating of the charger 114 of all of their vehicles 100 changed.

Upon the user's selection to change the power rating of their battery charger 114, the user may place their selection into a virtual shopping cart and may apply any other options, such as, for example, the location of the vehicle 100, e.g., to account for geographic differences or restrictions, for calculation of taxes, duties, surcharges, incentives, discounts, etc. The user may be required to purchase the change in the power rating of their battery charger 114, and the app, other software, and/or website may be adapted to accept such payment. The payment may be made, for example, by electronic funds transfer from the user's financial institution, a credit or debit card, a cryptocurrency wallet, a financial or deposit account associated with the app, other software, and/or website, gift card, an online payment service or system, etc. The app, other software, and/or website may validate, for example, based on the VIN of the vehicle 100, that the vehicle 100 is eligible for the change in the power rating of the charger 114 and that the power rating of the charger 114 can be changed, e.g., validating that the power rating of the charger 114 was not previously changed to the desired new or upgraded power rating.

After the validation, for example, any required payment is collected from the user and/or applied to the transaction, and an encrypted message is transmitted, for example, to a server, e.g., server 138, which, in turn, generates a code, digital certificate, token, etc., based on the user's selection to change the power rating of the charger 114, any options associated with that selection, and the VIN of the vehicle 100. The code, digital certificate, token, etc., is transmitted to the vehicle 100 via, for example, the wired and/or wireless communication link between the portable electronic device 136, the server 138, the non-portable electronic device 140, etc., and the vehicle 100. The vehicle 100, upon receipt of the code, digital certificate, token, etc., stores it, for example, in memory 144 of controller 112, validates it, e.g., by controller 112, and changes, e.g., permanently changes, the power rating of the charger 114 accordingly. The charger 114 itself may include a memory for storing the code, digital certificate, token, etc., or other information indicative of the power rating of the charger 114 and may charge and/or recharge the battery 108 battery based on the information contained in the memory of the charger 114 and/or based on information contained in the memory 144 of controller 112.

The change in the power rating of the charger 114 is described above in relation to upgrading or changing of the charging equipment for charging and/or recharging the battery 108 of the vehicle 100. However, it should be understood that the change in the power rating of the charger 114 may be made independent of any upgrade or change of the charging equipment. For example, it may be provided that the power rating of the charger 114 may be changed, e.g., increased, as an optional upgrade of the vehicle 100, which the owner or operator of the vehicle 100 may acquire or purchase from the manufacture of the vehicle 100, a dealer of the manufacture of the vehicle 100, an authorized repair facility, a third-party reseller, an OEM supplier, an independent third party, etc. Moreover, the ability to change the power rating of the charger 114 may be based on the ability of or the capacity of, for example, the battery 108 to be charged and/or recharged at a greater level than the power rating of the charger 114 as set at the time of manufacture, purchase, delivery, and/or assembly of the vehicle 100. For example, the performance, charge parameters, operating parameters, chemistry, voltage, etc., of the battery 108, the charger 114, etc., may be determined and/or monitored. Based on that determination and/or monitoring, it may be determined that the power rating of the charger 114 can be changed, e.g., increased, without sacrificing or negatively affecting performance, safety, etc., of the battery 108, the charger 114, other systems or components of the vehicle 100, and, consequently, the power rating of the charger 114 is able to be changed, e.g., increased, as described herein. In other words, a change in the power rating of the charger 114 may be permitted, e.g., by the controller 112, in the circumstance that it is safe to do so, that doing so would not negatively affect performance, etc., and a change in the power rating of the charger 114 may be prevented, e.g., by the controller 112, in the circumstance that it is or might not be safe to do so, that doing so would or might negatively affect performance, etc.

It should be appreciated that other features of the vehicle 100 may be modified, changed, upgraded, downgraded, added, removed, etc., by the same or similar processes as that described above for changing the power rating of the vehicle 100. For example, the processes described above for changing the power rating of the vehicle 100 may be utilized in corresponding manner to query and set, or activate, individual features with a respective encrypted token, such as setting an extended range of the vehicle, e.g., by increasing the accessible charge capacity of the battery 108, boosting the power of the vehicle 100, e.g., by increasing the power available to the motor 102, providing for extended charging of the battery 108, e.g., permitting charging of the battery 108 beyond its typical capacity, for example, to 110% of its typical capacity, for example, for long trips, to extend the range of the vehicle 100, etc.

What is claimed is:

1. A charging system for an electric vehicle, comprising:
   a rechargeable energy storage device of the vehicle adapted to store electrical energy and to supply the stored electrical energy to at least one electric motor of the vehicle to propel the vehicle;
   a charger adapted to supply electrical energy to the energy storage device according to a selectable power rating of at least two different power ratings to charge and/or recharge the energy storage device based on a selected one of the power ratings; and
   a controller adapted to select, according to an identifier uniquely associated with the vehicle, one of the power ratings of the charger to set the charger to charge and/or recharge the energy storage device based on the selected one of the power ratings;
   wherein the charger is adapted to supply electrical energy to the energy storage device according to a first one of the power ratings until the controller selects a second one of the power ratings that is different than the first one of the power ratings, and the charger is adapted to supply electrical energy to the energy storage device according to the second one of the power ratings after the controller selects the second one of the power ratings;
   wherein the first one of the power ratings represents a lower power rating than the second one of the power ratings; and
   wherein the charger is permanently adapted to supply electrical energy to the energy storage device according to the second one of the power ratings after the controller selects the second one of the power ratings.

2. The charging system according to claim 1, wherein the energy storage device includes a rechargeable battery.

3. The charging system according to claim 2, wherein the rechargeable battery includes a lithium-ion battery.

4. The charging system according to claim 1, wherein the charger includes an AC power inlet adapted to connect to an AC power source, the charger being adapted to supply electrical energy received via the AC power inlet to the energy storage device.

5. The charging system according to claim 1, wherein the power rating represents a maximum power deliverable to the energy storage device by the charger.

6. The charging system according to claim 1, further comprising a communication device adapted to communicate with an external electronic device to receive an instruction from the external electronic device and adapted to communicate with the controller to cause the controller to select one of the power ratings.

7. The charging system according to claim 6, wherein the external electronic device includes a portable electronic device.

8. The charging system according to claim 7, wherein the communication device is adapted to communicate with the portable electronic device via a wireless communication link.

9. The charging system according to claim 6, wherein the external electronic device includes a non-portable electronic device.

10. The charging system according to claim 6, wherein the external electronic device includes a server, the communication device adapted to communicate with the server via a wireless communication link.

11. The charging system according to claim 10, wherein the server is adapted to communicate with a second electronic device and to receive an instruction from the second electronic device to communicate to the communication device of the vehicle an instruction to select one of the power ratings.

12. The charging system according to claim 1, wherein the controller includes a memory device adapted to store data that represents the selected one of the power ratings, and the charger is adapted to supply electrical energy to the energy storage device according to the selected one of the power ratings based on the data stored in the memory device of the controller.

13. The charging system according to claim 1, wherein the charger includes a memory device adapted to store data that represents the selected one of the power ratings, and the charger is adapted to supply electrical energy to the energy storage device according to the selected one of the power ratings based on the data stored in the memory device of the charger.

14. The charging system according to claim 13, wherein the controller is adapted to store the data that represents the selected one of the power ratings in the memory device of the charger.

15. The charging system according to claim 1, wherein the vehicle is arranged as an electric motorcycle.

16. A charging system for an electric vehicle, the vehicle including a rechargeable energy storage device adapted to store electrical energy and to supply the stored electrical energy to at least one electric motor of the vehicle to propel the vehicle, comprising:
   a charger adapted to supply electrical energy to the energy storage device according to a selectable power rating of at least two power ratings to charge and/or recharge the energy storage device based on a selected one of the power ratings; and
   a controller adapted to select, according to an identifier uniquely associated with the vehicle, one of the power ratings of the charger to set the charger to charge and/or recharge the energy storage device based on the selected one of the power ratings;
   wherein the charger is adapted to supply electrical energy to the energy storage device according to a first one of the power ratings until the controller selects a second one of the power ratings that is different than the first one of the power ratings, and the charger is adapted to supply electrical energy to the energy storage device according to the second one of the power ratings after the controller selects the second one of the power ratings;
   wherein the first one of the power ratings represents a lower power rating than the second one of the power ratings; and
   wherein the charger is permanently adapted to supply electrical energy to the energy storage device according to the second one of the power ratings after the controller selects the second one of the power ratings.

17. An electric vehicle, comprising:
   at least one electric motor adapted to propel the vehicle;
   a rechargeable energy storage device adapted to store electrical energy and to supply the stored electrical energy to at least one electric motor of the vehicle to propel the vehicle;
   a charger adapted to supply electrical energy to the energy storage device according to a selectable power rating of at least two power ratings to charge and/or recharge the energy storage device based on a selected one of power ratings; and
   a controller adapted to select, according to an identifier uniquely associated with the vehicle, one of the power ratings of the charger to set the charger to charge and/or recharge the energy storage device based on the selected one of the power ratings;
   wherein the charger is adapted to supply electrical energy to the energy storage device according to a first one of the power ratings until the controller selects a second one of the power ratings that is different than the first one of the power ratings, and the charger is adapted to supply electrical energy to the energy storage device according to the second one of the power ratings after the controller selects the second one of the power ratings;
   wherein the first one of the power ratings represents a lower power rating than the second one of the power ratings; and
   wherein the charger is permanently adapted to supply electrical energy to the energy storage device according to the second one of the power ratings after the controller selects the second one of the power ratings.

* * * * *